United States Patent [19]

O'Malley

[11] 4,064,367

[45] Dec. 20, 1977

[54] DUAL TONE SELECTOR WITH ANSWERBACK SIGNALLING

[75] Inventor: Larry V. O'Malley, Batesburg, S.C.

[73] Assignee: Westinghouse Air Brake Company, Swissvale, Pa.

[21] Appl. No.: 708,642

[22] Filed: July 26, 1976

[51] Int. Cl.² ........................................... H04M 11/00
[52] U.S. Cl. ................................. 179/2 A; 340/171 R
[58] Field of Search ............... 179/2 A, 84 C, 84 VF, 179/89, 5 R, 5 P, 2 CA, 18 D; 340/171 R

[56] References Cited

U.S. PATENT DOCUMENTS

| | | | |
|---|---|---|---|
| 3,631,395 | 12/1971 | Zucker | 179/2 CA |
| 3,654,396 | 4/1972 | Biezeveld | 179/18 D |
| 3,849,764 | 11/1974 | Wang | 179/2 A |
| 3,859,462 | 1/1975 | Saxon | 179/2 A |

Primary Examiner—William C. Cooper
Assistant Examiner—Joseph A. Popek
Attorney, Agent, or Firm—A. G. Williamson, Jr.; R. W. McIntire, Jr.

[57] ABSTRACT

A function control code sequence of signals, each comprising a pair of audio frequency tones, is transmitted from a control location to a remote station selector. Each input signal is applied to a tone decoder element which separates the two tones through a filter, amplifier, detector network to produce a pair of logic signals representing the tones received. The sequential pairs of logic signals are applied to a code selector which converts the 2 of 7 format into a 1 of 12 digital code sequence equivalent to the original function control code selected at the control location. This digital sequence is applied through a programmable cross bar connector matrix to a sequence detector responsive only to a predetermined input sequence. The matrix is programmed to produce this predetermined sequence and actuate the sequence detector only when an assigned function code is received. When the sequence detector is actuated, its output is applied through another matrix to a pulse generator which produces an output pulse to actuate the desired function control. Each output pulse is also applied to the tone decoder to enable an analog switch which completes a feedback path for one of the input bandpass filter, compression amplifier networks. When the feedback path is complete, the filter, amplifier network oscillates at a preselected audio frequency to transmit an answerback signal to the control location to indicate that the transmitted function has been registered.

9 Claims, 3 Drawing Figures

DUAL TONE SELECTOR WITH ANSWERBACK SIGNALLING

BACKGROUND OF THE INVENTION

My invention pertains to a dual tone selector apparatus including an answerback signaling arrangement. More specifically, the invention relates to remote station code selector apparatus which includes a bandpass filter, compression amplifier network with a gated feedback circuit which actuates oscillation of the network to generate an answerback signal indicating the registration of a received control function.

The use of telephone selectors for the remote control of distant functions is well known in the supervisory control field. Since many such arrangements do not provide for the return of specific indications to the control point, it is desirable to have answerback signals to indicate to the operator that the transmitted control function has been received and registered. One form of such selectors uses audio frequency tones to transmit the selection code which chooses the remote station and/or the function to be controlled. Normally each code digit is represented by a pair of audio tones transmitted simultaneously. In these systems, it is highly desirable and more efficient to use an audio tone as the answerback signal. No special receiving apparatus is then needed at control location as the operator can hear the response. However, this requires an effective and efficient arrangement for generating the answerback signal.

Accordingly, an object of my invention is a telephone type selector system providing an audio frequency answerback signal.

Another object of the invention is a dual tone selector system with audio tone answerback for each remote station to indicate registry of a command function.

A further object of the invention is a dual tone selector, responsive to a code of successive tone pairs transmitted from a control office to select a control function when the proper code digits are received, which transmits an answerback tone to the office when the control code is received and registered.

Still another object of my invention is a code selector at a remote station responsive to the reception of a proper code sequence, each digit represented by a pair of audio frequency tones transmitted from a central location, to select the desired control function and to generate an audio tone answerback signal when the function selection is registered.

Yet another object of the invention is a telephone selector system for transmitting control functions to remote stations by means of digital codes, each digit of which is represented by a pair of audio frequency tones, each station selector responding to a preselected sequence of code digits to register the desired function and transmit an audio frequency answerback signal to the control location to indicate the registration of the transmitted function control.

A still further object of the invention is a dual tone selector, for use in a telephone selector system, which responds to the reception of a preselected code in the form of sequential pairs of audio frequency tones to register the selected function and to transmit an answerback audio frequency tone to the control office which transmitted the preselected code.

Another object of my invention is a dual tone selector, at a remote station of a telephone selector system, which includes a feedback circuit for the input bandpass filter and amplifier circuit network, enabled when a function transmitted from a control location is registered, to actuate the filter, amplifier network to generate an audio frequency answerback signal, within the bandpass range to indicate the registry of the function.

Other objects, features, and advantages of my invention will be apparent from the following specification and appended claims when taken with the accompanying drawings.

SUMMARY OF THE INVENTION

The dual tone selector of this invention is a sequential tone decoder which may be programmed to provide a single output from any 1 to 8 code digit sequence or two separate outputs from individual 1 to 4 digit sequences. Programming is variable between units but otherwise relatively hard-wired at each location. Each selector consists of three parts - a basic portion including the functions, a tone decoder element, and a code selector element. Each part may be a printed circuit board (PCB) with the last two elements plugging into jacks on the basic portion PCB. The associated control or office apparatus is of a type which can transmit selected sequential digital codes comprising 1 to 8 digits. Each digit is a pair of audio frequency tones, with a different pair for each of the twelve digit numerals or characters. In one typical system, seven tone frequencies are used, four low-range and three high-range, each pair consisting of one tone from each range. The transmission channel from the office, which may be a voice telephone circuit, is coupled to the station apparatus through a line transformer to present a balanced high impedance to the channel.

Each incoming signal, i.e., pair of tones, is applied from the transformer secondary to the tone decoder element. This incoming signal is processed through separate high and low tone range bandpass filters and associated compression amplifiers. Tone decoding is then accomplished by individual active filters. Each filter has an associated detector unit which produces a logic output whose direct current level corresponds to the presence or absence of the tone frequency. There are thus two logic signals for each code digit. These logic signals are supplied to the code selector circuits which decodes each pair by converting the 2 to 7 form into a 1 or 12 code format. In the specific arrangement shown, the converter output comprises the numerals 0 to 9 plus two special characters, herein X and Y. These digits are applied through a programmed matrix to a sequence detector and output matrix which detects the order of occurrence and produces an output only if the code digit sequence is correct, i.e., as progrmmed for that station or function. The output pulse or pulses are used on the basic circuitry portion in various ways to perform or actuate the selected function.

Each output pulse, which is of a predetermined duration, is supplied also to the tone decoder circuitry. During the time duration of the pulse, an analog switch is enabled which completes a feedback path for one or the other bandpass filter and compression amplifier network. Each filter, amplifier network is so tuned that completion of the associated feedback path creates oscillation within the network at a preset frequency, e.g., an audio frequency within the bandpass range. This generates an answerback signal which is transmitted over the channel to the office to indicate reception and registry of the selected function transmission.

BRIEF DESCRIPTION OF THE DRAWINGS

I shall now describe in greater detail the specific embodiment of the apparatus illustrated and then define the novel features thereof in the appended claims. Reference will be made to the accompanying drawings in which:

Figure 1:
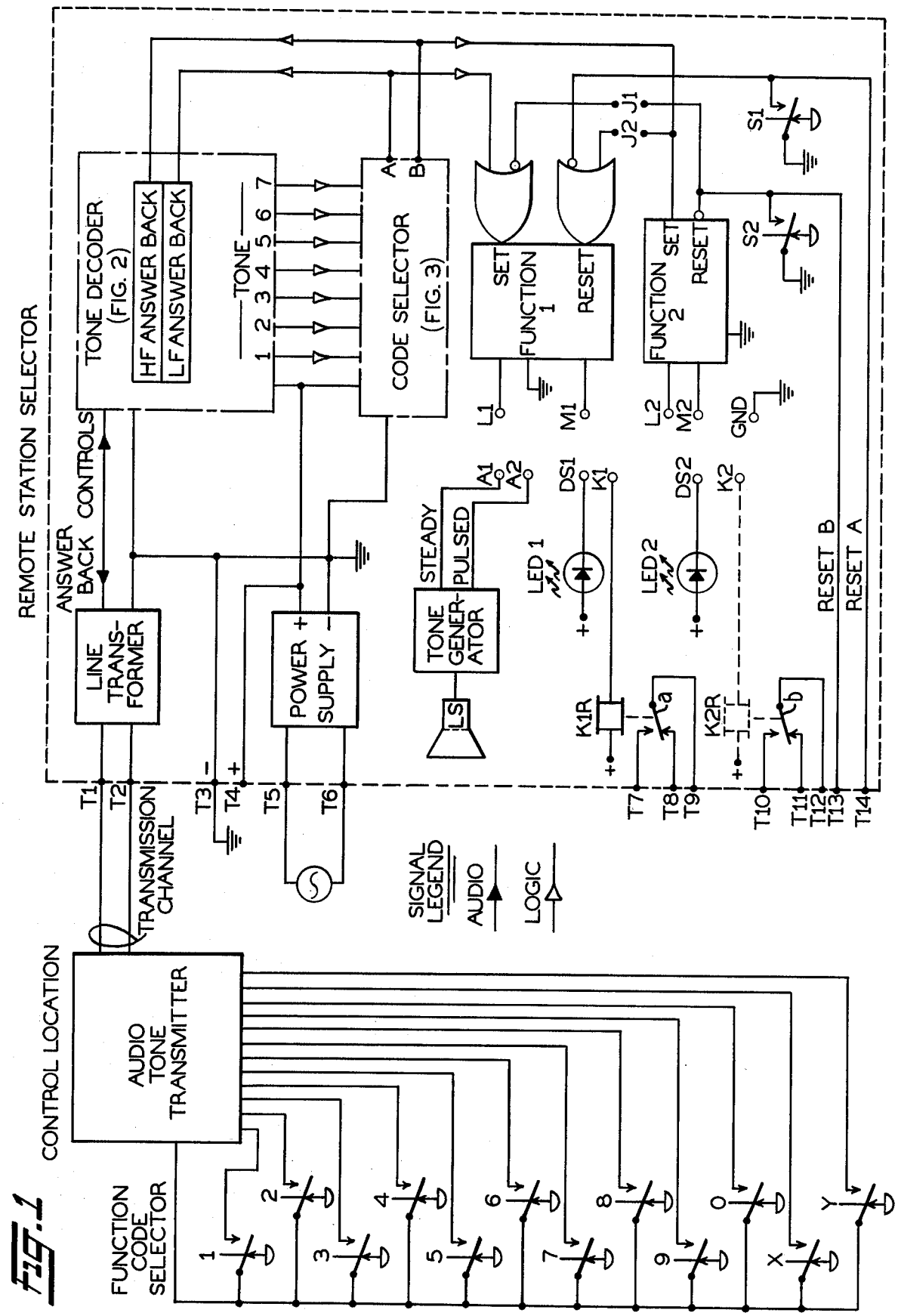
FIG. 1 is a schematic illustration, partly in block diagram form, of a remote control system with an office and one station having a dual tone selector embodying the answerback feature of my invention.

In each of the drawings, similar reference characters designate the same or similar parts of the apparatus. At the left center of FIG. 1 is a legend explaining the flow arrow symbols used in all drawing figures. Briefly, the solid arrows designate the flow of audio frequency signals or tones while the open arrows designate the logic signals, i.e. D. C. levels.

DESCRIPTION OF THE ILLUSTRATED EMBODIMENT

At the left of FIG. 1 is illustrated, briefly and conventionally, the control location or office for the telephone selector system. The elements shown are the audio tone transmitter and the function code selector. The conventionally shown transmitter may be of any known type which will generate a plurality of audio frequency tones, here assumed to be four tones in a low-frequency audio range and three in a high-frequency audio range. It is further assumed that the completion of any of the external selection circuits, extending from the bottom of the block, to the single return lead at the left actuates the transmission of a different preselected pair of tones, one low, the other high frequency. Twelve pairs are thus available so that twelve different characters may be used to make up selector codes. These are here designated as the ten numerals 0 to 9 and two special characters X and Y. The code selector consists of twelve spring return, push button switches, shown by conventional symbols, each with one normally open contact closed only while the push button is operated. All armature contacts are connected in common to the left transmitter lead while each front contact is individually connected to one code digit lead. The transmitter is connected to the transmission channel to transmit the selected pairs of tones to the remote stations. This may be, but is not limited to, a two-wire telephone channel or circuit.

A single remote station selector is shown at the right of FIG. 1. The complete station apparatus is that illustrated within the dash line block which includes as components a Tone Decoder and a Code Selector, each designated by a dot-dash block and shown in greater detail on the referenced drawing figure. Each subelement and the remainder of the basic apparatus may be mounted on a separate circuit board with the boards for the component units plugging into terminal blocks on the basic board. Direct current operating energy is supplied by a power supply or rectifier unit shown by the block at the left of the basic apparatus. This conventional unit is connected through terminals T5, T6 to the commercial alternating current source shown by conventional symbol. If desired, an external battery source may be substituted, connected across terminals T3, T4 with the polarity as shon. Common ground connections, which are also the negative D.C. supply, are shown throughout the apparatus by usual symbols.

Figure 2:
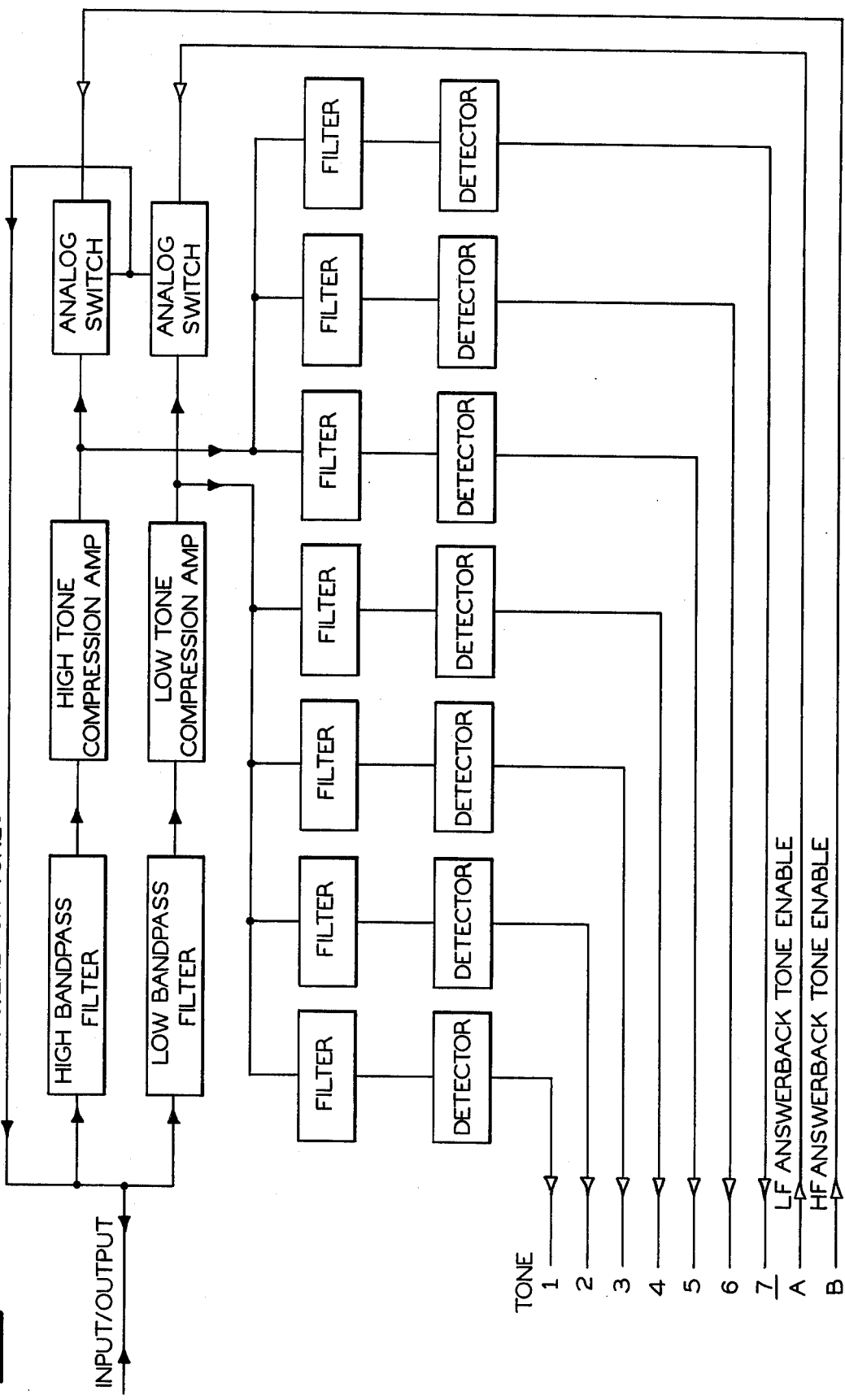
FIG. 2 is a conventional block diagram and flow chart illustration of the tone decoder portion of the selector of FIG. 1.

The transmission channel is connected through terminals T1, T2, to the primary winding of a line transformer which provides a balanced, high impedance load. The incoming audio tone signals are supplied from the unbalanced transformer secondary winding to the tone decoder element. Referring to FIG. 2, these signals are processed through separate high and low range bandpass filters and associated compression amplifiers, each shown by a conventional block since various known circuit arrangements may be used. Tone decoding is then accomplished by individual active filters and associated detector circuits of any known appropriate type. The use of the compression amplifiers provides a constant output from varying input levels and allows the unit to operate under poor signal to noise conditions. The detector circuits provide a selected logic signal when the corresponding tone is present in the station input signal. In other words, a pair of logic signals corresponding to the pair of audio tones comprising each incoming code signal appears on the output leads 1-7 at the lower left of FIG. 2.

As shown in FIG. 1, these logic signals are applied directly to the code selector element. The logic or tone input leads appear at the upper left of FIG. 3 and supply the logic signals to a code translator or converter. This unit, shown conventionally as such circuits are well known, converts the logic signals from a 2 of 7 code format into a 1 of 12 format. Thus the converter output is a digital logic code equivalent to the code selections made on the PB switches at the office. This digit output is applied to the horizontal busses of a programming matrix. The ten vertical busses, two sets of four code digit busses and an individual group bus associated with each set, represent inputs to a sequence detector.

Code digits are programmed into the desired sequence by connecting the proper horizontal, i.e., digit, bus to the selected vertical, i.e., sequence position, bus. For example, if the station or function code as selected at the office has more than four digits, the horizontal busses representing the code digits are connected in the code sequence to vertical busses 1, 2, 3, 4, 5, 6, 7, and 8, as many as needed. If a station and/or its function are represented by two codes, each of four digits or less, the digit busses representing the first or A code are connected in proper order to sequence busses 1 to 4 while the digit busses for the second or B code are connected to sequence busses 5 to 8.

The sequence detector consists of two separate 4-digit registers and a 4-digit counter, all of conventional, known circuitry. When used separately, i.e., for two 4-digit or less codes, each register waits for a valid first code digit which need not be the same for each register. The sequence detector acts upon the information at its inputs only when a strobe pulse is received from the timing circuits. If either register receives a valid first digit when the strobe pulse occurs, that register advances and the counter directs the sequence detector to look for the second digit. If the existing input digit is incorrect for both registers when a strobe pulse is received, the counter and registers are reset and the sequence detector waits for a new code with a correct first digit. When the two registers are used in series, for single codes of more than 4 digits, the second register is enabled by completing the "Over 4 Digits" connection between output lead Q4 and terminal D, as illustrated at the bottom of the sequence detector.

The group sequence busses G1 and G2 are special single digit codes used when the simultaneous selection of similar functions at several stations is desired. For example, the code digit X may be assigned to represent code G1. The code converter output bus X is then connected to the sequence bus G1 at the several stations where the similar function is to be selected. When a sequence detector receives an input from bus G1, it accepts this single digit in place of whatever code is programmed for sequence busses 1, 2, 3, and 4. In a similar manner, the single digit code Y is programmed to sequence bus G2 at the desired stations and such input is accepted by the corresponding sequence detectors in lieu of the code programmed on sequence busses 5, 6, 7, and 8.

The timing circuit network also receives the logic signal input designating the tones received. It outputs a strobe pulse after detecting a continuous digit input for a preset period, e.g., 110 milli-seconds; if the period between digits exceeds a predetermined time, e.g., 3 seconds; or if an invalid format is detected when the selector is programmed for high security. A strobe pulse is also used to reset the sequence detector elements after a valid sequence actuates an output. The detection of invalid input combinations by the invalid digit detection portion of the network inhibits further operation of the sequence detector, which is then reset.

Figure 3:
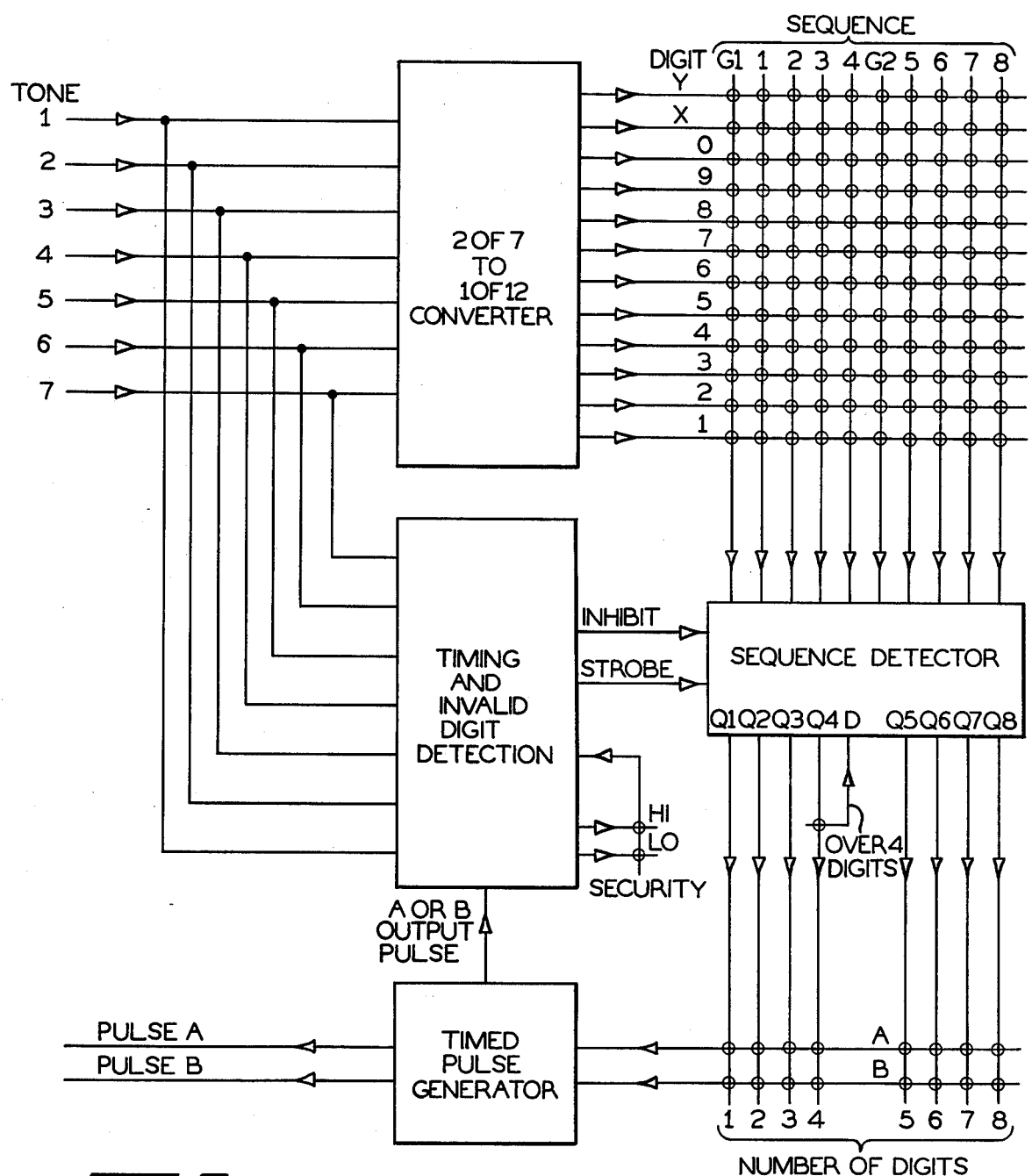
FIG. 3 is a conventional block diagram and flow chart illustration of the code selector portion of the selector of FIG. 1.

The output from the sequence detector on terminals Q1 to Q8 is converted into one or more output pulses by the output matrix at the bottom right of FIG. 3. A connection is made to the A bus from the Q output bus representing the last digit of a more than 4-digit code. For example, the connection is made between bus Q5 and the A bus for a 5-digit code sequence. If a station is programmed for two codes, each of less than 4-digits, the connection to the A bus is made from the Q bus representing the last digit of the first or A code, i.e., from one of busses Q1 to Q4. The Q bus representing the last digit of the second code (Q5 to Q8) is connected to the B bus. The A and B logic signals output from the output matrix are supplied to a timed pulse generator which produces corresponding output pulses (lower left) which all have a preselected length, e.g., 3 seconds. The occurrence of either an A or B pulse also results in a feedback to the timing network for reset purposes.

The output pulses A and B are converted into the desired type of function control by the Function 1 and 2 Units shown in FIG. 1. Conventional, known circuitry is used, as will be apparent from the following description, so that each function unit is illustrated by a conventional block. Each function unit supplies a momentary and a latched, i.e. continuing until reset, output when a logic signal is applied to its SET input terminal. These outputs are designated by the M1 and L1 terminals for Function 1 unit and terminals M2 and L2 for Function 2. Each latched output is interrupted when a logic signal is applied to the RESET input of that unit. The inputs to Function 1 are applied through conventional OR elements which allow two sources for each input which are maintained electrically isolated. It is to be noted that the reset signals for Function 1 and 2 units may be applied by PB switches S1 and S2, respectively, or from external sources over terminals T14 and T13, respectively. Switch S2 and terminal T13 may also be used to set Function 1 if jumper J1 is connected. Normally, output pulses A and B from the code selector are applied to set Function 1 and 2 units, respectively. If jumper J2 is connected, pulse B will also reset Function 1.

By selectively connecting jumpers between terminals M1, L1, M2, and L2 and the other terminals shown to their left, the outputs of the Function 1 and 2 units may be used to provide the output indications or operations shown in the following table:

A1 — Continuous Audible Alert Tone
A2 — Pulsed Audible Alert Tone
DS1 — Light Emitting Diode LED1
DS2 — Light Emitting Diode LED2
K1 — Relay K1R
K2 — Relay K2R (optional)

The alert tones are generated by the conventional TONE GENERATOR, when the designated input signals are supplied, and output through the speaker LS. Relay K1R normally controls both contact sets *a* and *b* but a second relay K2R may be added to separately control contact set *b*. These relay contacts provide obvious circuits between the associated external terminals in accordance with the contact position as the relay is energized or deenergized.

I shall now describe some examples illustrating the connections made in station apparatus to achieve the desired results. It is first assumed that, at the station shown in FIG. 1, it is desired to provide a momentary audible alert tone, to illuminate a lamp (LED) which is to be locally reset, and to momentarily operate an outside bell by relay control. It is further assumed that this operation is actuated by the code 53037, which the operator at the control location transmits by sequentially actuating PB switches 5, 3, 0, 3, and 7. At the station, connections must be made (FIG. 3) at security terminal L0 (code length more than 2 digits) and at the "Over 4 Digits" terminal of the sequence detector. In the program matrix (FIG. 3), connections are made between the following sets of sequence and digit busses: 1 and 5, 2 and 3, 3 and 0, 4 and 3, 5 and 7. In the output matrix, a single connection is made between bus Q5 and the A bus. Jumpers are then connected (FIG. 1) between Function 1 output terminal M1 and terminals A1 and K1 and between terminal L1 and terminal DS1. The external bell and its power supply connections are made to terminals T7 and T9. When the station has registered the transmitted code, momentary pulses are supplied to the tone generator to actuate speaker LS and to energize relay K1R to operate the bell. Device LED1 is energized to provide a light signal until Function 1 is reset by operation of switch S1. The Function 2 unit is not used in this specific operation.

As an example of the use of two different codes at a station, it is assumed that the selector system is used to separately call (page) two individuals at a single station, providing for each a momentary audible alert and a latched lamp indication which must be locally reset. It is further assumed that codes 123 and 456 are assigned to control these two functions. At the station, the same L0 security connection is made but the connection at the "Over 4 Digits" terminal is omitted since two less than 4-digit codes are used. In the program matrix, connections are made between sequence busses 1, 2, 3, 5, 6, 7 and respectively, digit busses 1, 2, 3, 4, 5, 6. In the output matrix, output lead Q3 is connected to the A bus and lead Q7 to the B bus. The Function 1 outputs M1 and L1 are jumpered to terminals A1 and DS1, respectively, while Function 2 outputs M2 and L2 are connected to terminals A2 and DS2, respectively. The first individual is thus called, when a pulse A is generated (code 123 transmitted), by a continuous audible signal from speaker LS of the same duration as pulse A, e.g., 3 seconds. An indication of this call is retained by the illumination of device LED1, which must be reset by operation of switch S1. When a pulse B is generated by transmitting code 456, the second individual is called by pulsed tones over a similar period of time and the call indicated by device LED2, reset by operation of switch S2.

In a similar type two code operation, the selector is assumed to control a remote on/off function. Also a station 37 function on" indication and local operation of the function are required. Assuming the same codes, the connections in the matrices and other points in FIG. 3 are as previously described. The output terminal L1 of Function 1 is connected to terminals K1 and DS1. The generation of a pulse A by the code selector element, when code 123 is registered, energizes relay K1R and illuminates device LED1. The external function is connected across terinals T7 and T9 so that it is operated "on" by the closing of front contact a of relay K1R. Jumpers J1 and J2 are also connected. When code 456 is transmitted and registered at the station, pulse B is applied, over jumper J2, to the lower terminal of the RESET OR gate for Function 1. This resets the unit, deenergizing relay K1R to operate the external function to "off" and turning off device LED1. Switch S1 will also reset Function 1. Although pulse B also sets Function 2, this is immaterial to the operation. The operation of switch S2 or the application of a ground signal to terminal T13, with jumper J1 connected, also sets Function 1 to turn on the external function.

Again referring to FIG. 1, it is to be noted that pulses A and B from the code selector are also fed back to the tone decoder to actuate the generation of answerback signals to the control location. Arbitrarily, the A pulse controls the low frequency answerback and pulse B controls the high frequency, both within the audio range. The transmission of either answerback over the channel indicates to the system operator, in an audible manner, that the last code transmitted has been received and registered. Referring to FIG. 2, the A and B pulses are actually individually applied to separate analog switches serving as a gating unit. Each analog switch, when enabled by the occurrence of the corresponding logic signal A or B, connects the output of the associated compression amplifier over a feedback circuit path to the input of the corresponding bandpass filter. The existence of this positive feedback path causes the filter, amplifier circuit to oscillate at a frequency determined by the bandpass filter. By proper adjustment of the signal phasing, each circuit may be made oscillatory at the center frequency of the corresponding bandpass filter. The resulting audio signal is supplied to the transmission channel through the line transformer and is received at the office as an answerback indication of the registry of the transmitted code.

The dual tone selector apparatus of my invention thus provides an effective yet simple arrangement for controlling from a central location remote functions which do not involve any safety factor. The function codes transmitted from the control location are reliably received and registered by the selected station or function selector to actuate the operation desired. An answerback signal is generated at the station and transmitted to the control office to provide an audible indication of the function code registry. This answerback is efficiently generated by the input filter and amplifier network which is tuned to oscillate at a selected frequency by a feedback circuit enabled only when a function control pulse is generated in response to the function code reception and registry. The selector arrangement is thus an efficient and economical means for controlling a remote function and indicating to the control location the registry of the function control code transmitted.

Although I have herein shown and described but a single form of the dual tone selector with answerback signaling embodying my invention, it is to be understood that varius modifications and changes may be made therein within the scope of the appended claims without departing from the spirit and scope of the invention.

Having now described the invention, what I claim as new and desire to secure by Letters Patent, is:

1. An answerback signaling arrangement for an audio tone selector system, in which function control codes of selected tones are transmitted from a control location to operate selected functions at remote stations, comprising in combination at each station,
   a. a filter, amplifier network tuned for receiving function control tones only within the range transmitted from said control location,
   b. a registry means connected to said filter, amplifier network and responsive to received tone codes for producing output pulses to control the selected function only when the received code is one assigned to the station functions,
   c. feedback circuit means coupled to said filter, amplifier network and also connected for receiving said registry means output pulses and enabled thereby for completing at least one feedback circuit for said filter, amplifier network for generating an answerback signal within the range of the audio function control tones, and
   d. said filter, amplifier network coupled for transmitting each answerback tone to said control location to indicate registry of the corresponding function control code.

2. An answerback signaling arrangement as defined in claim 1, in which the filter, amplifier network includes,
   a. at least one bandpass filter and compression amplifier circit path tuned to a preselected frequency band including the audio tones transmitted from the control office,
   b. an analog switch connected to be enabled by an output pulse of said registry means when a function control code is registered,
   c. a feedback circuit for said filter, amplifier circuit controlled by said analog switch to be completed when the switch is enabled,
   d. said filter, amplifier circuit path tuned by the completed feedback circuit to oscillate at a preselected frequency within the audio range of the filter pass band for generating an answerback signal,
   e. said filter, amplifier, feedback circuit network coupled for transmitting each answerback signal to said control location to indicate the registry of a transmitted code.

3. An answerback signaling arrangement as defined in claim 2 in which,
   the frequency to which said filter, amplifier, feedback circuit network is tuned is the center frequency of the pass band of the filter.

4. An answerback signaling arrangement as defined in claim 1, in which said filter, amplifier network comprises,
   a. a first and a second bandpass filter and compression amplifier circuit path, each individually tuned to a preselected frequency band within the audio range transmitted from the control location,
   b. a first and a second analog switch associated with said first and second filter, amplifier circuit paths, respectively, each connected to be enabled by a first and a second output pulse, respectively, produced by said registry means, when a first or a second type code is received,
   c. a feedback circuit associated with each filter, amplifier circuit path and controlled by the associated analog switch to be completed when that switch is enabled,
      1. each associated filter, amplifier, feedback circuit network tuned by the completed feedback circuit for oscillating at a preselected frequency within the corresponding filter bandpass range to generate a signal when a corresponding received function code is registered,
   d. each filter, amplifier, feedback circuit network coupled for transmitting each generated signal as an answerback signal to said control location to indicate registry of the corresponding transmitted function control code.

5. An answerback signaling arrangement as defined in claim 4 in which,
   the frequency to which each filter, amplifier, feedback circuit network is tuned is the center frequency of the pass band of the corresponding filter.

6. Selector apparatus for use at a remote station in a telephone selector system, in which codes including a preselected plurality of signals in a selected sequence are individually transmitted from a control location to control functions at remote stations, each transmitted signal comprising a pair of audio frequency tones, comprising in combination,
   a. a tone decoder element, including at least one bandpass filter and compression amplifier circuit path tuned to a preselected frequency band including the audio frequency tones comprising the function control signals, connected for receiving the code sequence of transmitted dual tone signals and responsive thereto for producing an output sequence of pairs of logic signals representing the tones received,
   b. a code selector element connected for receiving logic signals from said tone decoder element and operable for decoding the received sequence to produce a functon control pulse if the received signal sequence is identical to that assigned to a function at that station,
   c. a function control means connected for receiving each control pulse from said code selector element and responsive thereto for operating the function in the desired manner in accordance with the code transmitted,
   d. a first analog switch associated with said filter, amplifier circuit path of said tone decoder element and connected to be enabled by the pulse produced by said code selector element, and
   e. a feedback circuit for said filter, amplifier circuit path controlled by said analog switch to be completed when the switch is enabled,
   f. said filter, amplifier circuit path tuned by the completed feedback circuit to oscillate at a preselected frequency within the audio range of the filter pass for generating an answerback signal,
   g. said filter, amplifier, feedback circuit network coupled for transmitting each answerback signal to said control location to indicate the registry of the corresponding transmitted code.

7. Selector apparatus as defined in claim 6 in which, the frequency to which said filter, amplifier, feedback circuit network is tuned is the center frequency of the pass band of the filter.

8. Selector apparatus as defined in claim 6 in which,
   a. said code selector element produces a first or a second function control pulse as a first or a second assigned code sequence is received at the corresponding station,
   and which also includes,
   b. a second bandpass filter and compression amplifier circuit path, each such circuit path individually tuned to a different preselected frequency band within the range of the audio frequency tones transmitted from said control location,
   c. a second analog switch associated with said second filter, amplifier circuit path, said first and second switches connected to be enabled by said first and second pulses, respectively, produced by said code selector element,
   d. another feedback circuit associated with said second filter, amplifier circuit path and controlled by the second analog switch to be completed when that switch is enabled,
      1. each associated filter, amplifier, feedback circuit network tuned by the completed feedback circuit for oscillating at a preselected frequency within the bandpass range of the corresponding filter to generate a signal when the corresponding pulse is produced by said code selector element,
   e. each filter, amplifier, feedback circuit network coupled for transmitting each generated signal as an answerback indication to said control location that the corresponding function control code has been registered.

9. Selector apparatus as defined in claim 8 in which, the frequency to which each filter, amplifier, feedback circuit network is tuned is the center frequency of the pass band of the corresponding filter.

* * * * *